US012770621B2

(12) United States Patent
Mix et al.

(10) Patent No.: US 12,770,621 B2
(45) Date of Patent: Oct. 20, 2026

(54) METHOD FOR PROCESSING SPEECH INPUTS AND OPERATING DEVICE FOR CONTROLLING VEHICLE FUNCTIONS

(71) Applicant: MERCEDES-BENZ GROUP AG, Stuttgart (DE)

(72) Inventors: Bianca Mix, Stuttgart (DE); Florian Staib, Schorndorf (DE); Fabian Schöller, Kernen (DE); Stephan Arenswald, Böblingen (DE); Tobias Blankenhorn, Gärtringen (DE); Edith Kuhn, Sindelfingen (DE); Philip Rambowski-Mailhot, Ehningen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 135 days.

(21) Appl. No.: 18/834,790

(22) PCT Filed: Jan. 25, 2023

(86) PCT No.: PCT/EP2023/051811
§ 371 (c)(1),
(2) Date: Jul. 31, 2024

(87) PCT Pub. No.: WO2023/148063
PCT Pub. Date: Aug. 10, 2023

(65) Prior Publication Data

US 2025/0218435 A1 Jul. 3, 2025

(30) Foreign Application Priority Data

Feb. 1, 2022 (DE) ..................... 10 2022 000 387.2

(51) Int. Cl.
*G10L 15/22* (2006.01)
*B60K 35/10* (2024.01)
(Continued)

(52) U.S. Cl.
CPC .............. *G10L 15/22* (2013.01); *B60K 35/10* (2024.01); *B60K 35/22* (2024.01);
(Continued)

(58) Field of Classification Search
CPC ............... G10L 15/22; G10L 2015/223; G10L 2015/228; B60K 35/10; B60K 35/22; B60K 2360/148; G06F 3/04842
See application file for complete search history.

(56) References Cited

U.S. PATENT DOCUMENTS 5,632,002 A 5/1997 Hashimoto et al.
2004/0260562 A1* 12/2004 Kujirai .............. G01C 21/3608 704/E15.044
(Continued)

FOREIGN PATENT DOCUMENTS

DE 10360655 A1 7/2005
DE 102009058151 A1 6/2011
(Continued)

OTHER PUBLICATIONS

International Search Report and Written Opinion mailed Mar. 30, 2023 in related/corresponding International Application No. PCT/EP2023/051811.
(Continued)

*Primary Examiner* — Bhavesh M Mehta
*Assistant Examiner* — Jangwoen Lee
(74) *Attorney, Agent, or Firm* — PATENT PORTFOLIO BUILDERS PLLC

(57) ABSTRACT

Speech inputs used to control vehicle functions in a vehicle, having speech recognition and having graphics, assigned to the vehicle functions, are displayed on a screen of the vehicle. Vehicle functions can be controlled by a neutral short spoken command that cannot be unambiguously related to a vehicle function so that the displayed graphic of
(Continued)

the vehicle function directly reacting to the neutral short command is distinctively marked with respect to the simultaneously displayed graphics of the other vehicle functions.

10 Claims, 2 Drawing Sheets

(51) Int. Cl.
*B60K 35/22* (2024.01)
*G06F 3/04842* (2022.01)

(52) U.S. Cl.
CPC .... *G06F 3/04842* (2013.01); *B60K 2360/148* (2024.01); *G10L 2015/223* (2013.01); *G10L 2015/228* (2013.01)

(56) References Cited

U.S. PATENT DOCUMENTS

2006/0155547 A1 7/2006 Browne et al.
2007/0256027 A1 11/2007 Daude
2008/0033727 A1* 2/2008 Huber ..................... G10L 13/00 704/E15.045
2008/0059195 A1 3/2008 Brown
2016/0062635 A1* 3/2016 Feit ......................... G06F 9/485 715/765

FOREIGN PATENT DOCUMENTS

| | | | |
|---|---|---|---|
| DE | 102010054242 | A1 | 6/2012 |
| DE | 102016218270 | A1 | 3/2018 |
| EP | 0607615 | A1 | 7/1994 |
| EP | 1884921 | A1 | 2/2008 |
| EP | 2026328 | A1 | 2/2009 |

OTHER PUBLICATIONS

Office Action created Dec. 26, 2022 in related/corresponding DE Application No. 10 2022 000 387.2.
Office Action dated Apr. 24, 2024 in related/corresponding EP Application No. 23 702 291 .8.
Office Action dated Oct. 13, 2025 in related/corresponding KR Application No. 10-2024-7025136.
Office Action dated Feb. 27, 2026 in related/corresponding KR Application No. 10-2024-7025136.

* cited by examiner

METHOD FOR PROCESSING SPEECH INPUTS AND OPERATING DEVICE FOR CONTROLLING VEHICLE FUNCTIONS

BACKGROUND AND SUMMARY OF THE INVENTION

Exemplary embodiments of the invention relate to a method for processing speech inputs which are used to control vehicle functions in a vehicle, as well as to an operating device for controlling vehicle functions having at least one microphone and one screen.

An operating system for a vehicle is fundamentally known from DE 103 60 655 A1. The disclosed operating system comprises a display for displaying entries in a menu structure. The entries in the menu structure can be activated via speech control, wherein at least one entry from the menu structure simultaneously forms a keyword for the speech control.

Vehicle functions are increasingly able to be operated in a vehicle via speech control. In the case of the mentioned patent publication, the commands are formed by keywords within the menu, so that it is possible to recognize on the screen which command can be used to activate which vehicle function.

Furthermore, it is fundamentally known in the field of speech control how to control different vehicle functions via speech. Here, a distinction must essentially be made between two different types of command. One type is the command referred to as an unambiguous command in the scope of this disclosure, the structure of which command indicates which function should be controlled. For example, the command words “navigate to” unambiguously address a vehicle function in the area of the navigation system, such as inputting an address and then navigating to this address. In the case of an incoming telephone call, an unambiguous command would be “accept call” or “reject call”, for example. The command itself can therefore be unambiguously assigned to a specific vehicle function.

Furthermore, there is the command, referred to as a neutral short command in the scope of this disclosure, which is ambiguous. The neutral short command is frequently only formed by a word, e.g., in the German or also in the English language. Therefore, for example, the command “start” can mean both starting a navigation system, starting a certain playlist in the media system, the activation of seat heating, the activation of lighting, or optionally also accepting a phone call or similar. If different vehicle functions are available, it cannot therefore be defined exactly via such a neutral short command which vehicle function should be started via the short command because of its ambiguous nature. If different vehicle functions are available that can be activated via the neutral short command, these can be processed sequentially one after the other, for example. However, this is not particularly convenient for the user and, in case of doubt, can lead to the actually desired command being processed with a delay and vehicle functions possibly being started that the person using the vehicle did not actually intend to be started.

Exemplary embodiments of the present invention are therefore directed to an improved method enabling an efficient and targeted processing of speech commands for controlling vehicle functions even when neutral short commands are used, as well as to an operating device suitable for carrying out this method.

The method according to the invention for processing speech inputs, which are used to control vehicle functions in a vehicle, comprises speech recognition and graphics assigned to the vehicle functions, which are displayed on a screen of the vehicle. Different vehicle functions, which are available at the current time for pending activation by speech, can therefore be displayed simultaneously on one screen, for example in the style of boxes arranged next to each other or other types of entries. According to the invention, one of the graphics is now prioritized and distinctively marked on the screen. This displayed marking shows a user which function will react directly to an issued neutral short command, such as for example the word “start” or “launch”, preferably without mentioning a keyword, with the other vehicle functions symbolized by the other graphics displayed at the same time not reacting directly to such a neutral short command, which in principle would also be suitable for activating these vehicle functions. The neutral short command thus cannot be unambiguously related to a vehicle function or a category comprising a vehicle function, i.e., it cannot be determined using the short command which vehicle function this refers to. The short command, preferably consisting of a word, is to be understood to mean here that the command does not comprise information about a desired function, for example by a keyword describing the function or making a reference, but can be used universally for different applications. The distinctive marking of that displayed graphic out of the multiple simultaneously displayed graphics which is assigned to the vehicle function, which directly reacts to the neutral short command following the display of the graphics, means that a person using the vehicle can recognize with a quick look at the screen which of the vehicle functions currently can be controlled directly by the neutral short command. Preferably, the marking of each graphic assigned to the function reacting to a short command and shown on a display surface is always the same, consistent or at least equivalent.

In a very advantageous further development of the method according to the invention the vehicle function reacting to the neutral short command is determined from predefined functions suitable for the selection with a neutral command, wherein in each case one function of the predefined functions is dynamically prioritized with respect to a reaction to the neutral short command. Such predefined functions can be created, for example, using the empirical experience of the software developer for the vehicle, for example in the form of a list. The vehicle functions suitable with a short command are the applications that can be represented by the graphics, the function of which can be activated by a short command, i.e., preferably by an individual word. The prioritization of one of the predefined functions means that this function, i.e., currently only this function, can be activated with a neutral short command or reacts to the neutral short command. The dynamic prioritization makes it possible to determine the function reacting to the neutral short command depending on the situation, based on boundary conditions or sensor data read in from the vehicle. The prioritized function or the graphic assigned to the function is provided with a marking. The marking preferably looks identical or equivalent in terms of appearance for each of the prioritized functions, so that a user immediately recognizes the function that can be operated with a neutral speech command. The read-in sensor data comprises, for example, information about the driving status of the vehicle, about the driver and their status or about environmental conditions, which are either determined in the vehicle itself or are made available via a server via telematics. For example, a status change of speech-operated functions, such as an incoming telephone call, causes the priority to be dynamically shifted to the function whose status is changing. As further examples for status changes that can be reacted to with a speech input, mention could be made of appearing pop-up notifications of an information system, warning messages, traffic notifications or reaching a geographical position.

Additionally, or in particular alternatively, the prioritized vehicle function reacting to the neutral short command is determined by means of a model trained with historical data based on its relevance for a person using the vehicle. For example, a person who frequently uses the vehicle and who has repeatedly called up certain vehicle functions in certain situations can be taken into account accordingly, so that in a similar situation, the vehicle function that is called up particularly frequently in such a situation is given the highest priority and accordingly becomes the marked function that reacts directly to the neutral short command. Such models trained with historical data can be based on methods of adaptive learning or, in particular, the use of artificial intelligence or neural networks. The personalized prioritized functions are stored in a personalized manner.

As already mentioned, the vehicle function reacting to the neutral short command can also be determined, in particular, based on the vehicle context, for example the time of day, the time of year, the ambient temperature, the ambient brightness, the driving situation, a specific environmental situation detected by the vehicle's environment sensors, or a change in the status of a speech-operated function such as a telephone or an information system.

A person who sets up the vehicle determines and stores in a control unit which function is prioritized based on the vehicle context based on experience or expectation, for example activating the seat heating shortly after starting the vehicle in cold ambient temperatures.

A further additional or alternative way of determining the vehicle function reacting to the neutral short command, preferably prioritizing this as such from a selection of functions, is to determine it based on the person using the vehicle. For example, a profile can be called up for the corresponding person, who is recognized, for example, by an individually assigned vehicle key, a mobile end device assigned to them, such as a smartphone or similar. If this person is the person using the vehicle, in particular the person controlling the vehicle, the vehicle functions that can be called up directly via the neutral short command can, for example, be prioritized based on a priority stored in this person's profile or their individually set and saved preferences.

In addition, according to an extraordinarily favorable further development of the method according to the invention, in the event that by means of a speech input having an unambiguous command which thus comprises the direct or indirect naming of one of the vehicle functions which do not react to the neutral short command, in particular independently of the display on the screen. For example, if the vehicle function for starting the seat heating in the current situation is the one on the screen that would react to the neutral short command, then a different vehicle function can be activated at any time with an unambiguous command such as "navigate home". In this case, navigation is started accordingly. The unambiguous command comprises a keyword that can be unambiguously assigned to a vehicle function. The naming of the unambiguous command preferably activates the function independently of the display on the screen, i.e., even if no graphic assigned to the navigation is displayed on the screen.

According to another very favorable additional embodiment, one of the graphics is distinctively marked by an operating action of a person using the vehicle, so that the vehicle function assigned to this graphic is then specified as the vehicle function reacting to the neutral short command. A person using the vehicle can therefore override the presetting of the vehicle function reacting to the short command, which has been carried out in accordance with the methods described above, for example by selecting this function via a look or pointing gesture to the graphic or to an element unambiguously assigned to the vehicle function or else by touching the corresponding graphic on a touch-sensitive screen in order to react to the neutral short command. This means that the suggestion made by the control devices of the vehicle can be overridden so that changes can be made easily and efficiently. Such changes can be used again in the embodiment variant described above, in which the historical experiences of the system are taken into account, in order to learn for similar situations that the vehicle function selected by the operator action is automatically specified in the future in comparable situations or is prioritized higher accordingly in a priority list.

A very advantageous embodiment provides that the graphic assigned to the vehicle function reacting to the neutral short command is displayed on the screen by means of a graphic highlighting and/or centering in a horizontal and/or vertical direction on the screen. The graphic is therefore emphasized accordingly. This can take place by a simple marking, such as for example a marking symbol in the form of a dot or circle, but it can also be implemented by various other graphic possibilities. For example, the highlighted graphic can be changed in terms of its color or size, it can be backlit accordingly, it can flash or move to make it clear that this graphic or the vehicle function assigned to this graphic is the one that can be selected directly using the neutral short command. As an alternative or, in particular in addition to such graphic highlighting, the highlighting can also be realized by centering, for example, in a horizontal and/or vertical direction on the screen. For example, the graphic is displayed as the central graphic on the screen, while the other graphics, which symbolize other vehicle functions, move to the right and left or top and bottom edges.

According to a very advantageous embodiment of the method according to the invention, it can further be provided that the distinctive marking changes from the one graphic to another graphic as soon as the vehicle function assigned to the other graphic becomes the one that can be addressed via the neutral short command. So, if there is a change in the assignment, the marking can change from the one graphic, preferably in an animated display, to the other graphic. The trigger for the change can be a change in prioritization due to a changed situation, for example. For example, various vehicle functions can be displayed statically. For example, starting the seat heating can be selected as the vehicle function that can be addressed via the neutral short command and the relevant graphic can be visually marked accordingly. If the situation changes, for example because a call comes in, this incoming call is typically given higher priority in the current situation, so that the graphic for the incoming call is highlighted accordingly so that the call can be answered easily and efficiently using the neutral short command, for example "start". The same can apply to other situations, for example if a traffic jam has been recognized by the navigation device and a modified route suggestion has been created, which is offered to the person using the vehicle and in this situation becomes the vehicle function that should be able to be started easily and efficiently via the neutral short command. The animated representation comprises, for example, a continual gliding over of a marking of a graphic of one vehicle function onto a graphic of another vehicle function.

In an advantageous embodiment of the method, information about a speech input request from a user relating to a function displayed on a screen by means of the graphic is transmitted to a speech dialogue system together with the priority assigned to the vehicle function and, if the speech dialogue system confirms the priority, the graphic associated with the vehicle function is marked as reacting to the neutral short command. The request for a speech input to be made by a user is a graphic associated with the function on the display surface, which can be controlled by means of a speech input from a user and preferably asks for a speech input. Information about this preferably upcoming request is transmitted together with prioritization information to the speech dialogue system, which is thus activated for an evaluation of an upcoming speech input. The priority or prioritization determines that a neutral short command causes the vehicle function sending the information to the speech dialogue system to be controlled; the other functions shown simultaneously by graphics on the display surface cannot be controlled with the short command. If the speech dialogue system confirms the priority, the function requesting speech input is marked so that the user can easily identify which function is reacting to their short command. In an advantageous way, the function reacting to a neutral short command only takes place when the speech dialogue system confirms the priority and marking takes place. This allows the speech dialogue system to give preference to other dialogues and also prevents, for example, the marking from taking place before the speech dialogue system is ready to receive input.

The operating device according to the invention now serves to control vehicle functions and comprises at least one microphone and one screen. It is set up to carry out the method in one of the described design variants and thus provides the hardware on the device side for carrying out the method in one of the embodiments according to the invention.

BRIEF DESCRIPTION OF THE DRAWING FIGURES

Further advantageous embodiments of the method according to the invention and of the operating device result from the exemplary embodiment which is described in more detail below with reference to the figures, in which.

DETAILED DESCRIPTION

Figure 1:
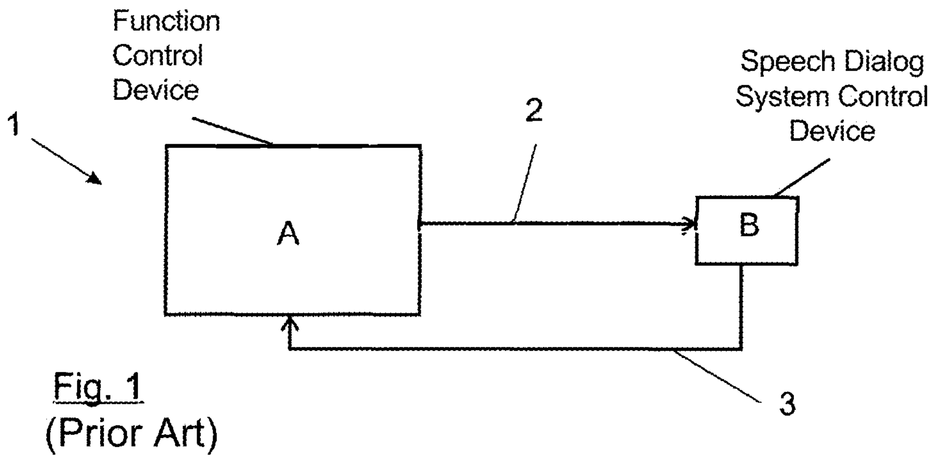
Fig. 1 (Prior Art)
FIG. 1 shows a system design according to the prior art.
Figure 3:
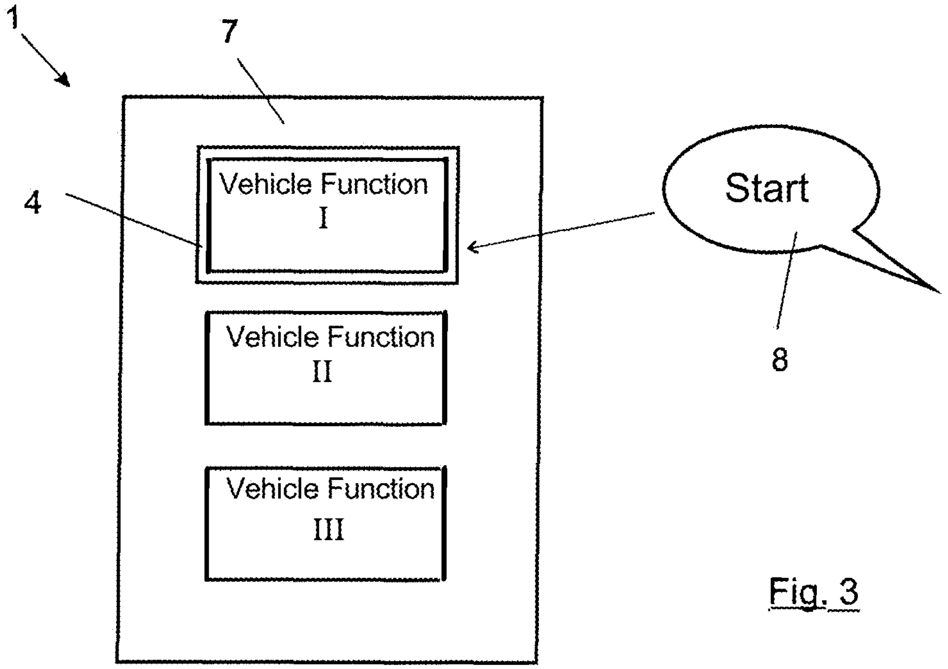
FIG. 3 shows a schematic representation of the visual assignment of vehicle functions to a neutral short command according to the invention.

In the representation of FIG. 1, an operating device 1 can be seen which is suitable for controlling vehicle functions I, II, III (see FIG. 3). The fundamental construction comprises a first system A, formed for example as a function control device, for controlling the corresponding vehicle functions I, II, III and a system B, which is formed as a speech dialogue system control device. The control devices are hardware devices having a processor, which is preferably designed as an integrated circuit and carries out calculations with the aid of data and/or programs that are saved, for example, in a ROM (read only memory), RAM (random access memory) and/or Flash ROM memory.

System A now requests a speech dialogue from system B for a function displayed by means of a graphic on a display surface, such as a screen, i.e., the system A prepares system B to receive a speech input. System B starts this dialogue by being ready to receive and recognizes an incoming speech command of a person using a vehicle (not shown here). Upon receiving the speech command after a request to be ready to receive has been issued according to the arrow labelled 2, system B returns information corresponding to the speech command received to system A according to the arrow 3. System A can then start the vehicle function I, II, III assigned to the corresponding speech command.

The problem here is that the person using the operating device 1 does not know which vehicle function they are addressing when using a neutral short command such as "start". Rather, they must give an unambiguous command in order to address a specific function, or it has to be accepted that all vehicle functions I, II, III reacting to the neutral short command are processed one after the other. This is not very convenient in practice.

Figure 2:
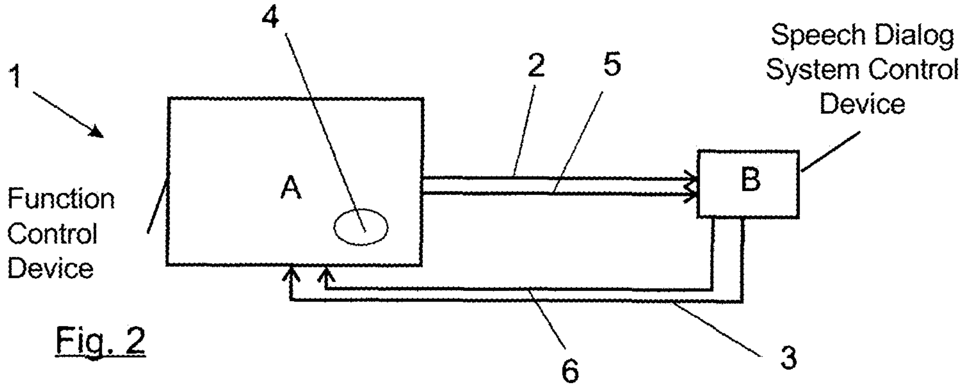
FIG. 2 shows a system design according to the invention.

In the representation in FIG. 2, now optional training of the operating device 1 can be seen which describes a process for marking a graphic of a vehicle function, reacting to a neutral short command. Here, of various vehicle functions I, II, III which can be controlled by the system A, a selected function is prioritized accordingly, which is schematically indicated here by a marking 4 of the one graphic shown on the display surface and associated with a vehicle function. Together with the request of the speech dialogue according to the arrow 2, as in the prior art, information about the prioritization can now be transmitted according to the arrow labelled 5. The system B checks the prioritization request and confirms or does not confirm this. In the case of confirmation, the system B then returns a synchronization, indicated by the arrow 6, of the overall priority, in addition to the pure information about the detected speech command, so that if the prioritization matches, marking 4 of the prioritized vehicle function I, II, III takes place on the display surface, indicating that it is reacting to a neutral short command. The person using the vehicle can interact very simply with a neutral short command 8 with the operating device 1, such that a very simple and convenient operation is possible. If the system B does not confirm the prioritization received from the system A, marking the corresponding function does not take place. Thus, the system B can decide whether the speech command is effective for the function associated with the request from system A or another function, preferably not displayed on the screen.

In an additional, or alternative, embodiment it can be provided that a user can also use a short command to activate vehicle functions I, II, III displayed on a screen and represented by a graphic or button, without the above-mentioned request to the speech dialogue system, as long as this is marked as reacting to a short command. This variant can be implemented, for example, when the speech recognition system is preferably continuously ready to receive, i.e., is activated even without a keyword.

Since a function, prioritized for the input of a neutral short command, is marked as being distinctive from the other functions, a user then knows which of the vehicle functions I, II, III can be activated with a speech input of the neutral short command.

For this purpose, the operating device 1 comprises a screen 7, represented in FIG. 3. On the display surface of the screen, different vehicle functions I, II, III are visualized in the form of graphics or buttons assigned to these vehicle functions I, II, III. The vehicle function prioritized from a predefined selection, or other variants explained in detail at the beginning, in this case the vehicle function I which can be controlled directly via a neutral short command 8, is highlighted graphically. This is shown on the screen 7 in the illustration of FIG. 3 by a double border around the vehicle function I. The double border therefore forms the marking 4 in the sense described above. If the neutral short command 8, such as the word "start" in this case, is now spoken, as shown by the speech bubble on the right in the illustration in FIG. 3, then it is clearly recognizable both for the system and visualized for the person using the operating device 1 that this neutral short command 8 starts the vehicle function I which is distinctively marked by the marking 4.

If the person using the operating device 1 wishes to address a different vehicle function, such as vehicle function II or III, they can do so at any time by either using an unambiguous command such as "start vehicle function II" or by moving the marking 4 from its previous position for vehicle function I to a position for another vehicle function II, III, for example by using a look or pointing gesture, in order to make this vehicle function II, III the vehicle function that can be executed directly by the short command 8.

This results in an operating device 1 that simply and efficiently enables convenient operation, even with neutral short commands 8, and therefore very quickly and intuitively.

Figure 4:
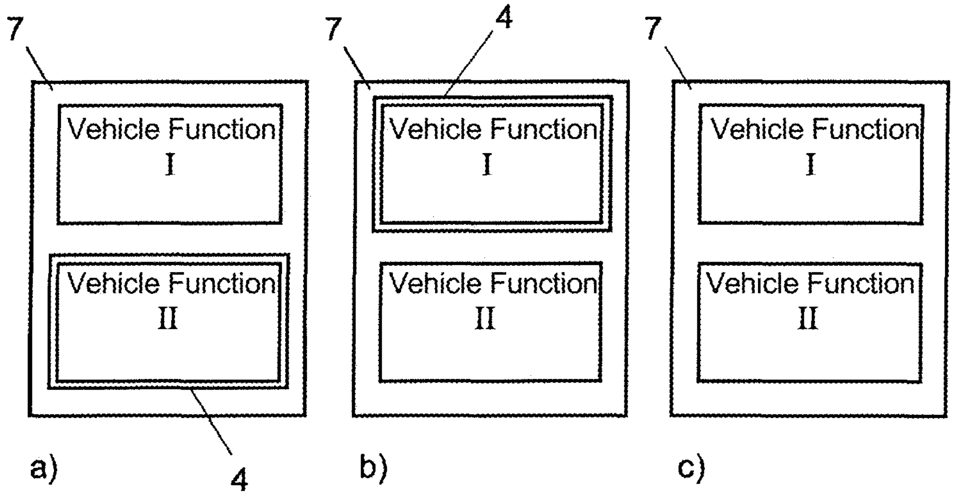
FIG. 4 shows three different cases of a possible scenario according to the invention.

Using the illustration in FIG. 4, three different cases a), b) and c) will now be shown and explained. Two vehicle functions I and II are each shown on a screen. Purely by way of example, vehicle function I involves starting the seat heating and vehicle function II involves accepting or rejecting an incoming call. In the first case a), the system A prioritizes the call, i.e., the vehicle function II, as shown in FIG. 2, and the system B, i.e. the speech control, confirms this prioritization. The confirmation of the prioritization causes the generation of a marking 4 of the button, representing the vehicle function II.

The neutral short command 8 following the generation of the marking, which could also be described as an implicit command, therefore now prioritizes the vehicle function II, as shown by the marking 4, so that the incoming call is accepted when the speech command "start" is given, for example.

Case b) would be the other way around. Here, the system A prioritizes the vehicle function I, i.e., the switching on of seat heating, and the system B confirms this priority. Accordingly, the marking 4 is arranged in the region of the vehicle function I. In this case, the seat heating is switched on via the neutral short command "start".

Case c) is now based on this case b). Here as well, the system A prioritizes the vehicle function I, i.e., the seat heating for example. Here however, the system B, i.e., the speech control, does not confirm this priority, but prioritizes the individual dialogue. In this case, a marking 4 of one of the vehicle functions I, II does not take place. Consequently, this means that none of the vehicle functions I, II shown on the display surface can be controlled via a neutral short command 8 or implicit speech command, as is obvious to the user. The neutral short command activates, for example, another vehicle function determined by system B and/or an explicit speech command is required here, i.e., an unambiguous command which explicitly names the desired function represented on the display surface by means of the graphic.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for processing speech inputs to control a plurality of vehicle functions in a vehicle comprising a function control device and a speech dialog system control device, the method comprising:

prioritizing, by the function control device, the plurality of vehicle functions;

receiving, by the speech dialog system control device from the function control device, the prioritization of the plurality of vehicle functions;

receiving, by the speech dialog system control device, a first speech input that is a first neutral short command;

confirming, by the dialog control system device, the prioritization of the plurality of vehicle functions, simultaneously displaying graphics assigned to the plurality of vehicle functions on a screen of the vehicle with the displayed graphic for a vehicle function of the plurality of vehicle functions having a highest priority being distinctively marked relative to the displayed graphs of other ones of the plurality of vehicle functions, and processing the first received speech input based on the first neutral short command being directed to the vehicle function having the displayed graphic marked distinctively;

receiving, by the speech dialog system control device, a second speech input that is a second neutral short command; and determining, by the dialog system control device, that the prioritization of the plurality of vehicle functions is not confirmed, simultaneously displaying graphics assigned to the plurality of vehicle functions on the screen without any of the displayed graphics being distinctively marked, and processing the second received speech input by the dialog system control device to determine a function associated with the second received speech input.

2. The method of claim 1, wherein the prioritization is determined using predefined functions suitable for selection with the first and second neutral short commands, wherein one of the predefined functions is dynamically prioritized with respect to a reaction to the first and second neutral short command.

3. The method of claim 1, wherein the prioritization of the plurality of vehicle functions is determined using a model trained with historical data based for a person using the vehicle.

4. The method of claim 1, wherein the prioritization of the plurality of vehicle functions is determined based on a context of the vehicle.

5. The method of claim 1, wherein the prioritization of the plurality of vehicle functions is determined based on a person using the vehicle.

6. The method of claim 1, wherein each of the plurality of vehicle functions is activatable by a speech input having an unambiguous command comprising a naming of a corresponding one of the plurality of vehicle functions that is not the vehicle function having the highest priority.

7. The method of claim 1, wherein a person using the vehicle marks a graphic of one of the plurality of vehicle functions on the screen, wherein the marked graphic is the vehicle function having the highest priority.

8. The method of claim 1, wherein the distinctive marking of the vehicle function having the highest priority involves displaying the graphic for the vehicle function having the highest priority with a graphic highlighting or the graphic for the vehicle function having the highest priority is horizontally or vertically center on the screen in a manner distinguishable from other graphics on the screen.

9. The method of claim 1, wherein when another one of the plurality of vehicle functions has the highest priority, the graphic for the another one of the plurality of vehicle functions is distinctive marked so that the another one of the plurality of vehicle functions is addressable via the first and second neutral short commands.

10. A system for controlling vehicle functions, the system comprising:

a microphone;

a screen;

a function control device comprising a first processor and coupled to the screen; and a speech dialog system control device comprising a second processor and coupled to the microphone and the function control device, and wherein the function control device is configured to prioritize the plurality of vehicle functions, wherein the speech dialog system control device is configured to receive the prioritization of the plurality of vehicle functions from the function control device, wherein the speech dialog system control device is configured to receive a first speech input that is a first neutral short command, wherein the dialog control system device is configured to confirm the prioritization of the plurality of vehicle functions, the screen is configured to simultaneously display graphics assigned to the plurality of vehicle functions with the displayed graphic for a vehicle function of the plurality of vehicle functions having a highest priority being distinctively marked relative to the displayed graphs of other ones of the plurality of vehicle functions, and the speech dialog system control device is configured to process the first received speech input based on the first neutral short command being directed to the vehicle function having the displayed graphic marked distinctively, wherein the speech dialog system control device is configured to receive a second speech input that is a second neutral short command, and wherein the dialog system control device is configured to determine that the prioritization of the plurality of vehicle functions is not confirmed, the screen is configured to simultaneously display graphics assigned to the plurality of vehicle functions on the screen without any of the displayed graphics being distinctively marked, and the dialog system control device is configured to process the second received speech input by the dialog system control device to determine a function associated with the second received speech input.

* * * * *